INVENTORS.
DONALD H. POLZIN
ELMER J. QUICK

April 10, 1962    D. H. POLZIN ET AL    3,028,999
FERTILIZER DISTRIBUTOR
Filed Aug. 11, 1958    2 Sheets-Sheet 2

INVENTORS.
DONALD H. POLZIN
ELMER J. QUICK

ATTORNEYS

United States Patent Office 3,028,999
Patented Apr. 10, 1962

3,028,999
FERTILIZER DISTRIBUTOR
Donald H. Polzin and Elmer J. Quick, Horicon, Wis., assignors to Deere & Company, Moline, Ill., a corporation of Delaware
Filed Aug. 11, 1958, Ser. No. 754,280
12 Claims. (Cl. 222—189)

The present invention relates generally to agricultural implements and more particularly to fertilizer distributors and the like.

The object and general nature of the present invention is the provision of a new and improved fertilizer distributor in which substantially no compressive forces are imposed upon the fertilizer material but, instead, the fertilizer is handled as gently as possible and is maintained substantially at all times in a loose or fluffy condition, with the result that there is practically no tendency for the fertilizer material to be crushed or packed solidly against the associated parts. Hence, there is substantially no tendency for the fertilizer to build up on and adhere to the feed gates, openings and other associated parts, such as frequently occurs when fertilizer, particularly fertilizer of high phosphate content, is forced between or against closely mounted parts, or through relatively small openings, as when attempting to distribute fertilizer at relatively low rates of discharge.

More particularly, it is a feature of this invention to provide a fertilizer distributor in which rotatable vaned impeller wheels are mounted an appreciable distance above the bottom of the hopper containing the fertilizer material, and the hopper is provided with a delivery or discharge zone that lies well above the hopper bottom. Further, according to this invention, the impeller means is rotated so as to raise or lift up the fertilizer rather than compressing and compacting the same, and to pass the fertilizer material upwardly and out through the discharge zone, thus maintaining the fertilizer in a loose condition.

Specifically, it is a further feature of this invention to provide a fertilizer distributor having discharge opening means disposed above the bottom of the hopper and means rotatable within the hopper for sweeping the fertilizer across the bottom of the hopper and then upwardly to a point where the fertilizer falls out through the discharge opening means under the action of gravity. Thus, the fertilizer is not subjected to any compressive or compacting forces and remains in a loose and readily flowable condition, even when damp.

Another particular feature of the present invention is the provision of a fertilizer distributor in the form of a hopper having discharge openings in one wall thereof above the bottom of the hopper, with rotatable impeller wheels arranged in groups that are spaced apart, the spaces in between the groups being located generally opposite the discharge openings and the impeller wheels being so constructed and arranged as to shift the fertilizer laterally toward the aforesaid spaces from which the fertilizer is discharged under the action of gravity over the lower edges of the aforesaid discharge openings.

An additional feature of this invention is the provision of a generally vertically movable gate which is disposed adjacent the lower edge portion of the discharge openings and is raised or lowered, as desired, when it is necessary to reduce or increase, respectively, the rate at which the fertilizer flows by gravity from the aforesaid spaces.

These and other objects and advantages of the present invention will be apparent to those skilled in the art after a consideration of the following detailed description, taken in conjunction with the accompanying drawings, in which.

Figure 1:
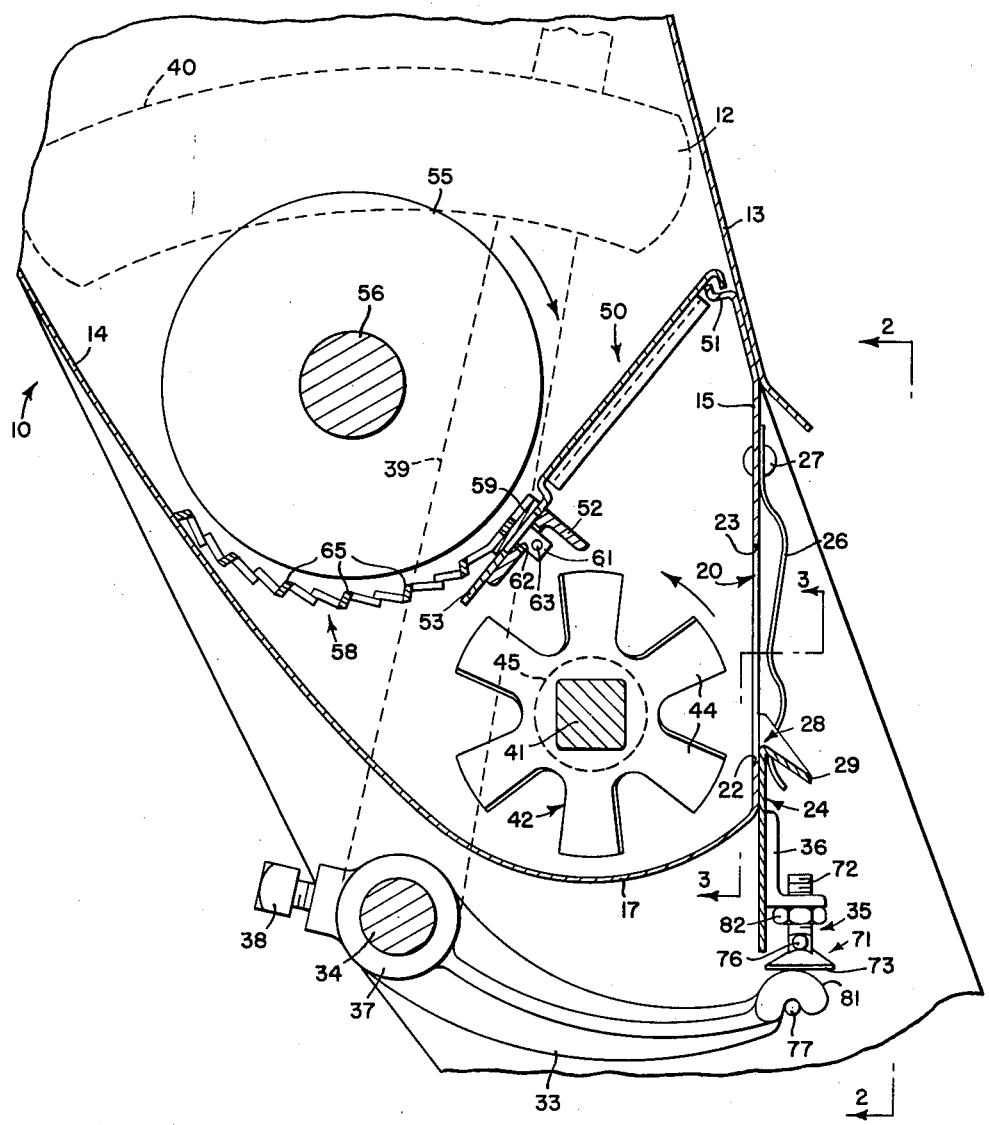
FIG. 1 is a cross sectional view taken through the fertilizer hopper that forms a part of an implement in which the principles of the present invention have been incorporated.

Referring first to FIG. 1, the principles of the present invention have been shown as incorporated in a fertilizer distributor 10 that is carried by and forms the rear portion of a grain drill. The fertilizer distributor 10 includes a hopper 12 having front wall means 13 and rear wall means 14. The lower portion of the front wall means, as indicated at 15, is disposed generally vertically and at its lower portion is joined with the bottom wall 17 of the fertilizer hopper. The curvature of the bottom wall 17 is such the latter joins smoothly with the rear wall 14.

The vertical front wall section 15 is provided with a plurality of transversely spaced apart openings 20, each having a lower edge 22 and an upper edge 23, each opening 20 being generally rectangular. Disposed along the lower portion of the hopper 12, is an elongated substantially flat vertically adjustable slide or gate 24 that is held substantially flat against the vertical forward or outer face of the front wall 15 by means of a plurality of springs 26 that are anchored at their upper ends to the front wall 15 by any suitable means, such as rivets 27.

Figure 2:
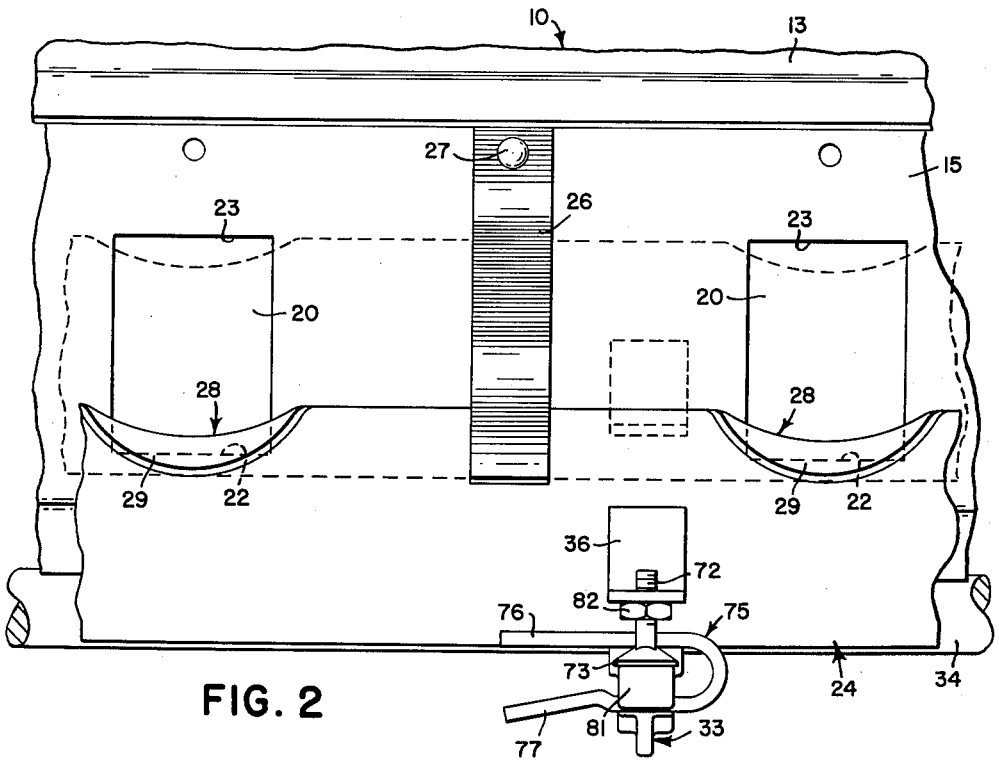
FIG. 2 is a fragmentary front view, taken generally along the line 2—2 of FIG. 1 and showing certain details of the front hopper wall and the associated vertically adjustable gate that controls the rate of flow.

As best shown in FIG. 2, the upper edge of the shiftable gate or slide 24 is provided with a plurality of notches 28 that serve as discharge openings or ports that register with the hopper wall openings 20. Each of the notches 28 is formed with a downwardly extending lip or port 29 that is curved, as best shown in FIG. 2, to center the outflowing stream of fertilizer. Preferably, the lips or ports 29 are formed by bending and shaping portions of the upper edge of the gate or slide 24 at spaced apart points therealong, corresponding in spacing to the spaced apart openings 20.

The gate or slide 24 is raised and lowered along the face of the wall 15 by any suitable means, such as a pair of arms 33 that are fixed to a rockshaft 34 and connected at their outer ends by adjustable connectors 35 with associated angle clips 36 or other suitable connections fixed to or carried by the lower portion of the gate 24. Only one arm 33 and associated connections are shown in the drawings, but it will be understood that there is an arm 33 and associated parts adjacent each end of the gate or slide 24. Each arm 33 has a hub section 37 disposed about the shaft 34, and set screw means 38 provides an adjustable connection for fixing each arm 33 to the shaft. Any suitable means, such as a hand lever 39 and associated locking sector 40, may be provided for rocking the shaft 34 to different positions for raising or lowering the gate 24, and holding the shaft 34 in selected positions of adjustment.

Figure 3:
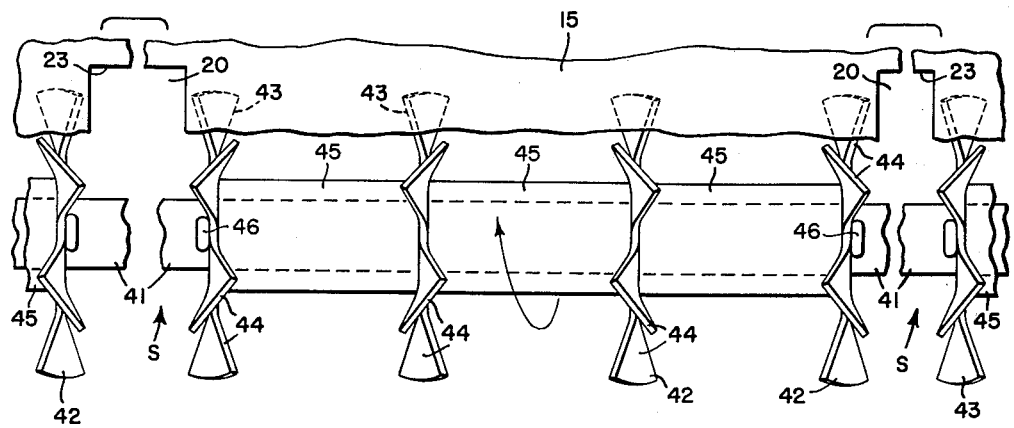
FIG. 3 is a fragmentary view taken generally along the line 3—3 of FIG. 1, showing the arrangement and action of the impeller wheels.

A non-circular shaft 41 is disposed for rotation in the lower portion of the hopper 12 and, as best shown in FIG. 3, carries a plurality of groups of right and left hand impeller wheels 42 and 43. Each of the impeller feed wheels 42 and 43 is formed with generally flat or propeller-like vanes 44 that are twisted so as to be disposed at an angle to the plane of rotation of the feed wheel as a whole. Each wheel has a polygonal opening nonrotatably mounting the wheel on the shaft 41.

As will best be seen in FIG. 3, the feed wheels in each group are arranged in right and left hand pairs and are held in axially spaced relation by sleeves 45. Cotter pins 46 maintain the sleeves and wheels against axial displacement on the shaft 41, and the arrangement is such that there are spaces $s$ between the several groups. Each group consists of four wheels, two being right hand and two left hand, and the wheels 42 and 43 and the spacing sleeves 45 are so arranged on the shaft 41 that fertilizer is shifted to the right into the adjacent space *s* by the two right hand wheels 42 and fertilizer is shifted to the left by the two left hand wheels into the other adjacent space *s*. As mentioned above, the spaces *s* are disposed, respectively, immediately adjacent and behind the discharge openings 20 and in the lowermost position of the slide or gate 24 the discharge portions thereof lie substantially in the same horizontal plane with the axis of the feed wheel shaft 41, as shown in FIG. 1.

A baffle 50 is disposed within the hopper 12, the forward edge being fixed in a suitable way, as by clips 51 or the like, to the front wall 15 of the fertilizer hopper. The lower edge of the baffle is supported on and secured to an angle member 52 that is supported in any suitable way by the ends of the hopper. The baffle 50 extends downwardly and rearwardly at an angle and has the lower edge, indicated at 53, of the baffle spaced an appreciable distance above the feed wheels 42 and 43, and since the latter are disposed well above the bottom 17 of the hopper, there is no tendency for fertilizer to become built up on the adjacent surfaces. In one structural embodiment of this invention, the closest spacing between the feed or impeller wheels 42 and 43 and adjacent surfaces was in the nature of about 3/16 of an inch. It was found that even fertilizer with a high phosphate content was not crushed by movement of the impeller wheels with the above mentioned spacing and that such fertilizer did not build up on adjacent surfaces of the hopper or one the baffle. The baffle functions to support the major portion of the weight of the fertilizer within the hopper and prevents unnecessary compaction of the fertilizer material within the hopper above the impeller or feed wheels.

Above the baffle 50 and generally between the latter and the rear hopper wall 14 is an agitator 55 that is rotated and mounted on an agitator shaft 56. The agitator 55 may be of any suitable construction. The shafts 41 and 56 are driven by any suitable means. Below the agitator 55 is a screen 58 that is formed of expanded metal that is curved to lie close to the agitator. A strip 59 is spot welded to one edge of the screen and carries studs 61 that extend down through openings 62 in the angle 52, whereby the latter supports the screen with the rear edge thereof against the rear wall 14 of the hopper. Pins or cotters 63 fix the screen to the angle 52. The screen 58 is arranged with web portions 65 of the expanded metal angled to direct material from the agitator through the screen.

Rotation of the agitator 55 serves to maintain the main body of the fertilizer above the baffle 50 in a loose and fluffy condition and as the fertilizer feeds downwardly through the screen 58 into the bottom portion of the hopper, the fertilizer is engaged by the groups of feed wheels 42 and 43. Since the wheels of each group are arranged in right hand and left hand relation, the fertilizer material is shifted laterally along the sleeves 45 toward the spaces *s* between the groups of feed wheels. Also, the rotation of the feed wheels, which is a counterclockwise direction as viewed in FIG. 1, serves to bring material from the back portion of the hopper generally forwardly into the lower portion and then upwardly to points in front of the feed wheel shaft 41, from which the material falls through the openings 20 and out of the hopper over the upper edge portions or lips 29 of the gate or slide 24. The feed wheels are thus rotated in the direction that tends to keep the fertilizer material in the bottom of the hopper in a loosened or fluffy condition, with no tendency to force or press the fertilizer through small openings or the like that might tend to cause the fertilizer to build up on adjacent parts.

The rate of feed is regulated by raising or lowering the adjustable slide or gate 24, and this is done by rocking the shaft 34 to shift the gate or slide 24 upwardly or downwardly along the openings 20, raising the gate or slide when it is desired to decrease the rate of feed. Whether the gate or slide is disposed in an upper position or in a lower position, the fertilizer material in the bottom of the hopper is maintained in a loose and fluffy condition, and adidtional quantities of fertilizer flow downwardly past the lower edge 53 of the baffle only in the quantity sufficient to replace that which falls outwardly through the discharge ports 20.

Each of the adjustable connectors 35 include an inverted bolt member 71 having an upper threaded portion 72 extending through a threaded opening in the clip 36 and a lower head 73 that is flat on its underside. The shank of the bolt 71 is apertured transversely to receive a hairpin spring connector 75, the upper end 76 of which extends through the shank opening. The lower end 77 of the spring connector 75 engages in a notch 78 formed in the outer end of the gate actuating arm 33. The upper portion of the arm end is generally cylindrically curved, as at 81, to provide substantially line contact with the flat face of the bolt head 77. A lock nut 82 serves to fix the bolt 71 in adjusted position in the clip 36. The position of the gate 24 relative to the actuating arms 33 may be adjusted in small increments by disconnecting the hair pin springs 75, loosening the lock nuts 82, and turning the bolts 71 upwardly or downwardly in the clips 36, as required.

When moving the drill in transport, there is little tendency for material to spill out over the upper edge or over the lips 29 of the slide or gate 24 because in transport the feed wheels are not rotated. Moreover, in transport the feed wheels serve as a restriction that prevents fertilizer, even free flowing material, from shifting across the lower portion of the hopper and out over the discharge portions 29. If desired, the rockshaft 39 may be operated to raise the gate or slide 24 substantially to a point closely adjacent or actually closing over the upper edges 23 of the openings 20, thus positively retaining the fertilizer within the hopper. By lowering the arms 33 and taking out the hairpin springs 75, the gate 24 may be removed from behind the spring retainers 26 and entirely disconnected from the hopper, as for cleaning purposes.

While we have shown and described above the preferred structure in which the principles of the present invention have been incorporated, it is to be illustrated that our invention is not to be limited to the particular details, shown and described above, but that, in fact, widely different means may be employed in the practice of the broader aspects of our invention.

What we claim, therefore and desire to secure by Letters Patent is:

1. Fertilizer distributing means comprising an elongated hopper having a bottom wall and a side wall provided with opening means above the bottom wall, an adjustable gate disposed against said side wall and movable upwardly and downwardly relative to said opening means, a shaft carried by said hopper generally along the bottom thereof adjacent the side of the hopper generally opposite the side wall having said opening means, arm means on said shaft and disposed in axially spaced apart relation, said arm means extending generally across said bottom wall to points generally underneath said adjustable gate, and adjustable means connected to act between said arm means and one of said shaft and gate to adjust the position of the gate relative to any given position of said shaft.

2. Fertilizer distributing means as defined in claim 1, further characterized by means on the end portion of said gate for abuttingly receiving the outer portion of said arm means, and resilient means holding the outer portion of said arm means against said arm-receiving means on the end portion of said gate.

3. The invention set forth in claim 2, further characterized by said resilient means comprising a connector detachable from one of said gate and said arm means.

4. The invention set forth in claim 2, further characterized by spring means holding said vertically adjustable gate against said side wall, said spring means accommodating the removal of said gate for cleaning purposes when said arm means is lowered.

5. Fertilizer distributing means as defined in claim 1, further characterized by said elongated hopper having an upper portion and a lower portion, agitating means in the upper rear portion of the hopper and fertilizer discharging means in the lower portion of the hopper generally forward of said agitating means, said fertilizer discharging means being disposed forward of the agitating means, a solid baffle extending part way across the hopper between said fertilizer discharging means and said agitating means and located above the forward part of the fertilizer discharging means and generally in front of the agitating means, an apertured screen connecting the rear edge of said solid baffle with the opposite wall of said hopper, said screen extending generally over the rear portion of said fertilizer discharging means, and means connected to rotate said fertilizer discharging means in a direction such that the rear portion of said fertilizer discharging means moves downwardly away from said apertured screen and lifts fertilizer up to the upper portion of said gate.

6. The invention set forth in claim 5, further characterized by said apertured screen comprising a section of expanded metal having the interconnected web sections thereof disposed approximately perpendicular to the adjacent portions of the agitating means.

7. In fertilizer distributing means as defined in claim 5, the further improvement of baffle-supporting means comprising a baffle support extending generally longitudinally of the hopper between said front and rear walls, said baffle being connected to the front wall of the hopper and to said baffle support, said screen being connected at its forward edge to said baffle support and at its rear edge to the opposite wall of said hopper, said agitating means being disposed above said screen.

8. Fertilizer distributing means comprising an elongated hopper having a bottom wall and spaced apart side walls, one of said side walls having opening means therein spaced above said bottom wall, an adjustable gate disposed against said one side wall and having its upper edge disposed adjacent the lower portion of said opening means, said gate being movable generally vertically along the adjacent face of said one side wall to carry the upper edge of said gate selected distances above the lower edge of said opening means, a plurality of resilient members disposed generally vertically and fixed at their upper ends to the outer side of said one side wall above and between said opening means, the lower portions of said resilient members engaging said adjustable gate and holding the latter against the outer face of said one side wall in any position of adjustment of said gate, and means connected with said gate to raise and lower it along said one side wall while the gate is held against said one side wall by said plurality of resilient members.

9. In a fertilizer distributor including an elongated hopper having front and rear walls, a baffle fixed at its upper edge to one of said walls and extending generally downwardly and inwardly of the hopper, a member extending generally longitudinally of the hopper between and spaced from said front and rear hopper walls and supporting the lower edge of said baffle, the latter terminating short of the opposite wall of said hopper, an apertured screen extending from the lower portion of said baffle to said opposite hopper wall, and means fixing the inner edge of said screen to said baffle-supporting member.

10. The invention set forth in claim 9, further characterized by said baffle-supporting member being apertured, said screen supporting means comprising a strip fixed to said screen, and studs fixed to said strip extending through apertures in said baffle-supporting member.

11. Fertilizer distributing means comprising an elongated hopper having a bottom wall and spaced apart side walls, one of said side walls having a plurality of laterally spaced apart openings therein spaced above said bottom wall, an adjustable gate disposed against said one side wall generally below said openings and having its upper edge disposed adjacent the lower portions of said openings, said gate being movable generally vertically along the adjacent face of said one side wall to carry the upper edge of said gate selected distances above the lower edges of said openings, the upper edge of said gate having a plurality of spaced apart discharge notches formed with downwardly curved lips over which fertilizer is adapted to flow, rotatable fertilizer impeller means disposed in the hopper along but spaced appreciably above the bottom wall, so as not to crush or compact fertilizer between the impeller means and said bottom wall, for lifting fertilizer and discharging it over said lips, and means connected with said gate to raise and lower it along said one side wall.

12. Fertilizer distributing means comprising an elongated hopper having a plurality of fertilizer discharge openings, a shaft non-circular in cross section mounted for rotation in the lower portions of said hopper, a plurality of spaced apart impeller members disposed on said shaft and having polygonal openings corresponding to the cross section of said shaft, whereby said impeller members are caused to rotate with said shaft, said members being arranged along said shaft in a plurality of groups, sleeves generally circular in cross section disposed on said shaft between the impeller members of each group, and means fixed to said shaft and disposed substantially against the end impeller members of each group for holding the sleeves and members of each group against axial displacement along said shaft.

References Cited in the file of this patent

UNITED STATES PATENTS

| | | |
|---|---|---|
| 889,329 | Pallas | June 2, 1908 |
| 1,306,823 | Larson | June 17, 1919 |
| 1,439,843 | Schick | Dec. 26, 1922 |
| 1,466,398 | Holadia | Aug. 28, 1923 |
| 1,526,275 | Garduno | Feb. 10, 1925 |
| 1,758,065 | Sherling et al. | May 13, 1930 |
| 1,957,594 | Helm | May 8, 1934 |
| 2,104,887 | Rueger | Jan. 11, 1938 |
| 2,318,064 | Delaney | May 4, 1943 |
| 2,541,008 | Stahmer et al. | Feb. 6, 1951 |
| 2,631,760 | Hoppes | Mar. 17, 1953 |
| 2,639,571 | Kelly | May 26, 1953 |
| 2,643,031 | Lowry | June 23, 1953 |
| 2,673,741 | Durand | Mar. 30, 1954 |
| 2,678,145 | Juzwiak et al. | May 11, 1954 |
| 2,710,117 | Fritz et al. | June 7, 1955 |
| 2,717,104 | Hoppes | Sept. 6, 1955 |
| 2,796,203 | Masters et al. | June 18, 1957 |
| 2,801,030 | Beck | July 30, 1957 |
| 2,801,772 | Schiebel | Aug. 6, 1957 |
| 2,817,460 | Bond | Dec. 24, 1957 |
| 2,819,826 | Kirschmann | Jan. 14, 1958 |
| 2,845,884 | Clausing et al. | Aug. 5, 1958 |
| 2,893,740 | Gaddis | July 7, 1959 |